United States Patent
Perri

(10) Patent No.: US 9,623,838 B1
(45) Date of Patent: Apr. 18, 2017

(54) RELEASABLE VEHICULAR BOOT AND BOOT RETURN STATION

(71) Applicant: Joel Benjamin Perri, Arvada, CO (US)

(72) Inventor: Joel Benjamin Perri, Arvada, CO (US)

( * ) Notice: Subject to any disclaimer, the term of this patent is extended or adjusted under 35 U.S.C. 154(b) by 0 days.

(21) Appl. No.: 15/291,912

(22) Filed: Oct. 12, 2016

Related U.S. Application Data

(60) Provisional application No. 62/240,435, filed on Oct. 12, 2015.

(51) Int. Cl.
*B60R 25/09* (2013.01)
*B60R 25/00* (2013.01)

(52) U.S. Cl.
CPC ............ *B60R 25/093* (2013.01); *B60R 25/00* (2013.01); *B60R 25/09* (2013.01)

(58) Field of Classification Search
CPC . Y10T 70/5841; Y10T 70/5889; Y10T 70/40; B60R 25/093; B60R 25/09; B60R 7/08
USPC ............... 70/14, 225, 226; 188/32; 180/287; 280/402
See application file for complete search history.

(56) References Cited

U.S. PATENT DOCUMENTS

| | | | | |
|---|---|---|---|---|
| 127,794 A * | 6/1872 | Ransom | ................... | E05C 19/18 292/288 |
| 598,656 A * | 2/1898 | Colton | .................... | B60R 25/09 70/226 |
| 1,042,875 A * | 10/1912 | Bishop | ................... | B62H 5/142 188/31 |
| 1,395,532 A * | 11/1921 | Tilden | ................. | B60R 25/0227 70/158 |
| 1,401,971 A * | 1/1922 | Faison | .................... | B60R 25/09 70/15 |
| 1,438,656 A * | 12/1922 | Mahoney | ................ | B60R 25/09 188/31 |
| 1,467,353 A * | 9/1923 | Childress | ................ | B60R 25/09 70/15 |
| 3,537,548 A * | 11/1970 | Jeppesen | ................... | B60T 3/00 188/32 |
| 3,687,238 A * | 8/1972 | Carpenter | ................. | B60T 3/00 188/32 |
| 3,845,643 A * | 11/1974 | Barrett | .................... | B60R 25/09 188/32 |
| 4,304,111 A * | 12/1981 | Nolin | .................. | B60R 25/0221 70/18 |
| 4,368,769 A * | 1/1983 | Rookasin | ................ | B60C 27/10 152/218 |

(Continued)

*Primary Examiner* — Suzanne Barrett
(74) *Attorney, Agent, or Firm* — Plager Schack LLP

(57) ABSTRACT

A releasable vehicular boot coupled to a vehicle's tire is designed to immobilize the tire. The vehicular boot includes a triangular sheet having a hole situated proximate the first corner of the sheet, a first chain having a first end coupled to the second corner of the triangular sheet and a second end coupled to the third corner of the triangular sheet to create a loop in the first chain, and a second chain having a first end slidably mounted to the first chain. The loop in the first chain is disposed around the tire. The second chain is disposed through a suspension component of the vehicle and the hole in the triangular sheet. The second end of the second chain is coupled to a locking mechanism to prevent a detachment of the second chain from the hole in the triangular sheet.

4 Claims, 3 Drawing Sheets

(56) References Cited

U.S. PATENT DOCUMENTS

| | | | | |
|---|---|---|---|---|
| 4,651,849 A * | 3/1987 | Givati | ............... | B60R 25/093 180/287 |
| 4,819,462 A * | 4/1989 | Apsell | ............... | B60R 25/093 70/14 |
| 4,854,144 A * | 8/1989 | Davis | ............... | B60R 25/093 70/226 |
| 4,913,265 A * | 4/1990 | Richards | ............... | B60R 25/093 188/32 |
| 5,214,944 A * | 6/1993 | Wolthoff | ............... | B60R 25/093 188/32 |
| 5,333,477 A * | 8/1994 | Davis | ............... | B60R 25/093 188/32 |
| 5,832,759 A * | 11/1998 | Yamabe | ............... | B60R 25/093 188/32 |
| 6,139,231 A * | 10/2000 | Kissel | ............... | B60P 3/075 410/10 |
| 6,993,942 B2 * | 2/2006 | Boni | ............... | A63C 11/02 70/14 |
| 8,002,232 B2 * | 8/2011 | Meislahn | ............... | B60R 25/00 248/317 |
| 8,596,099 B1 * | 12/2013 | Eldred | ............... | E05B 73/0005 70/14 |
| 9,528,302 B2 * | 12/2016 | Loughlin | ............... | E05B 67/383 |
| 2005/0247087 A1 * | 11/2005 | Clarke | ............... | B60R 25/093 70/226 |
| 2006/0162406 A1 * | 7/2006 | Chen | ............... | B62D 43/007 70/225 |
| 2009/0188284 A1 * | 7/2009 | Mechalchuk | ............... | B60R 25/093 70/225 |

\* cited by examiner

RELEASABLE VEHICULAR BOOT AND BOOT RETURN STATION

RELATED APPLICATION

The application claims priority to provisional patent application U.S. Ser. No. 62/240,435 filed on Oct. 12, 2015, the entire contents of which is herein incorporated by reference.

BACKGROUND

The embodiments herein relate generally to vehicle boots.

Cities have parking regulations that pertain to no-parking zones, timed parking zones, or the like. Violators may have their vehicles towed or immobilized by vehicle boots. Currently, the majority of existing boots are based on the Denver Boot design that is a clamping type device. These are costly and easily destroyed with a simple hacksaw. The electronic release model is extremely expensive and can easily be affected by the elements rendering the electronics useless. Current vehicle boots are also disadvantageous because they require parking enforcement personnel who secured a boot to a vehicle's tire to return to the site to remove the boot from the vehicle. This is time-consuming and burdensome for both the parking enforcement personnel and the vehicle's owner.

As such, there is a need in the industry for a releasable vehicular boot that addresses the limitations of the prior art, which provides violators the option to remove boots from their vehicles and return them to a storage station themselves.

SUMMARY

A releasable vehicular boot coupled to a tire of the vehicle and configured to immobilize the tire is provided. The vehicular boot is configured to be secured to and removed from the tire with enhanced efficiency. The vehicular boot comprises a generally triangular sheet comprising a first corner, a second corner and a third corner, the triangular sheet comprising a hole situated proximate the first corner, a first chain comprising a first end coupled to the second corner of the triangular sheet and a second end coupled to the third corner of the triangular sheet to create a loop in the first chain, and a second chain comprising a first end and a second end, the first end of the second chain being slidably mounted to the first chain, wherein the loop in the first chain is disposed around the tire, wherein the second chain is disposed through a suspension component of the vehicle and the hole in the triangular sheet, the second end of the second chain being coupled to a locking mechanism to prevent a detachment of the second chain from the hole in the triangular sheet, thereby securing the vehicular boot to the tire of the vehicle.

In certain embodiments, a vehicular boot return station configured to store a plurality of vehicular boots are provided. The vehicular boot return station comprises a generally C-shaped base member configured to be disposed on a ground surface, a pair of generally V-shaped dividers coupled to the base member, each divider in the pair of dividers being coupled to opposing sides of the C-shaped base member, and a post coupled to the C-shaped base member, wherein the vehicular boot return station is configured to secure a first vehicular boot between the pair of dividers and a second vehicular boot between the post and one of the pair of dividers.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
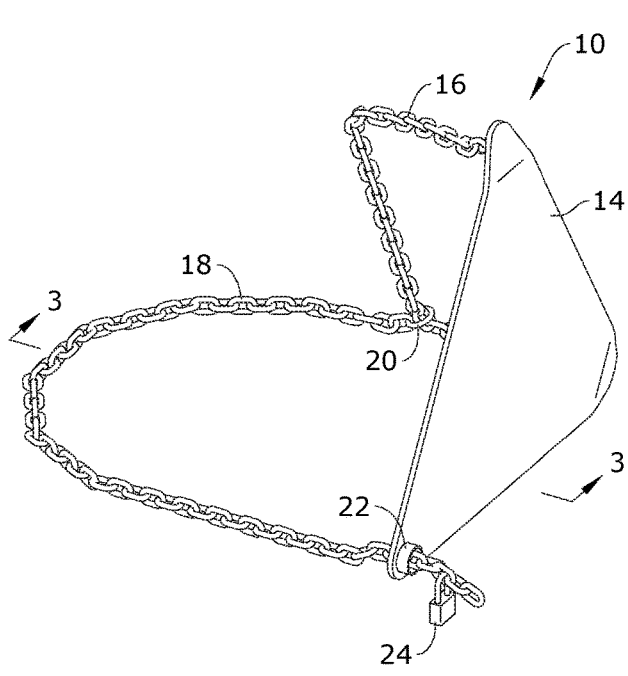
FIG. 1 depicts a perspective view of certain embodiments of the vehicular boot.
Figure 3:
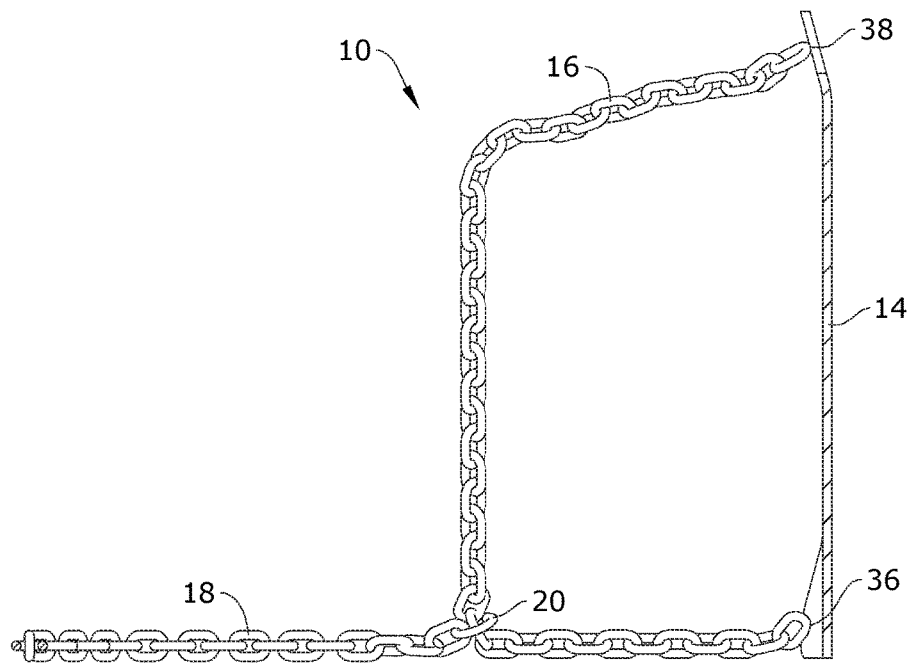
FIG. 3 depicts a section view of certain embodiments of the vehicular boot taken along line 3-3 in FIG. 1.

As depicted in FIGS. 1 and 3, vehicular boot 10 is configured for use with a tire of a vehicle (not shown) to immobilize the tire. Vehicular boot 10 generally comprises triangular sheet 14, loop chain 16 and tail chain 18. Triangular sheet 14 is preferably a plate plasma cut from a 10 gauge steel sheet. The dimensions of triangular sheet 14 may vary to accommodate different sized tires. In a preferred embodiment, triangular sheet 14 comprises a length of approximately 20"-60" between adjacent corners. A first corner of triangular sheet 14 comprises a hole and tubular ring 22 coupled thereto. In a preferred embodiment, tubular ring 22 is welded to a face of triangular sheet 14 and aligned with the hole in triangular sheet 14. The diameter of the hole in triangular sheet 14 and diameter of tubular ring 22 are both approximately 1½".

Loop chain 16 is preferably a grade 70 steel chain approximately 40"-60" long. A first end of loop chain 16 is welded to a second corner of triangular sheet 14 at upper chain weld point 38. A second end of loop chain 16 is welded to a third corner of triangular sheet 14 at lower chain weld point 36. These connections create a loop in loop chain 16 sufficiently large to be disposed around a tire of the vehicle (not shown).

Tail chain 18 is preferably a grade 70 steel chain approximately 36"-60" long that is slidably mounted to loop chain 16. More specifically, a first end of tail chain 18 comprises connecting ring 20, which is sufficiently large to permit loop chain 16 to slidably adjust therethrough. This allows the first end of tail chain 18 to slide along loop chain 16 from upper chain weld point 38 to lower chain weld point 36 on triangular sheet 14.

In operation, vehicular boot 10 is preferably coupled to the driver side's front tire and rim (not shown). However, it shall be appreciated that vehicular boot 10 may be coupled to any tire/rim of the vehicle. Triangular sheet 14 is placed against the side of the vehicle's tire and rim. Loop chain 16 is disposed around the tire. Tail chain 18 is inserted through a tie rod or suspension component (not shown) of the vehicle such as an upper control arm or lower control arm as is known in the field, then passed through the hole and tubular ring 22 of triangular sheet 14. Lock 24 is coupled to the second end of tail chain 18 as depicted in FIG. 1. In this configuration, vehicular boot 10 prevents the vehicle's tire from moving. Lock 24 prevents tail chain 18 from detaching from the hole and tubular ring 22 of triangular sheet 14. Lock 24 is preferably a padlock type lock, which may include a combination lock mechanism. In an alternative embodiment, lock 24 may be an electronic lock or other locking mechanism known in the field.

Figure 2:
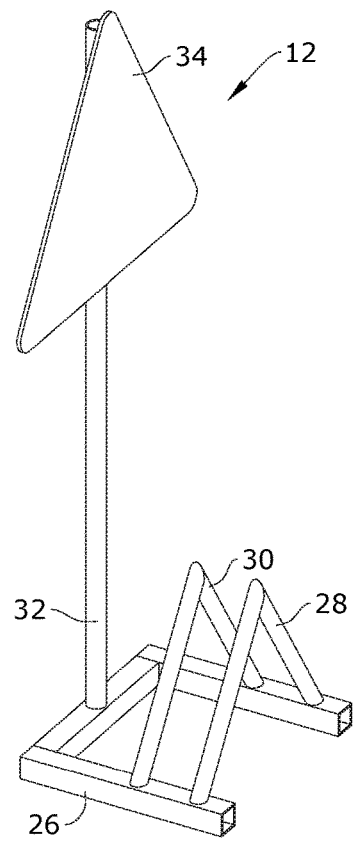
FIG. 2 depicts a perspective view of certain embodiments of the vehicular boot return station.
Figure 4:
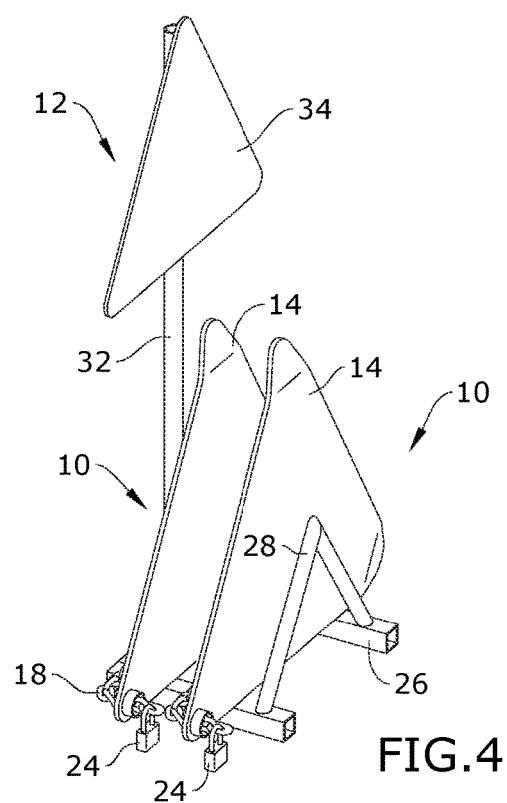
FIG. 4 depicts a perspective view of certain embodiments of the vehicular boot return station shown in use.

FIGS. 2 and 4 depict boot return station 12, which is configured to store vehicular boots 10 until ready for use. Each vehicular boot 10 may be locked to boot return station 12 to prevent theft of the device. Boot return station comprises base 26, first divider 28, second divider 30, upright post 32 and sign 34.

Base 26 is a generally C-shaped assembly made from tubular members welded together. Each divider in first and second dividers 28, 30 comprises a generally V-shape and is welded to opposing sides of the C-shaped assembly of base 26. It shall be appreciated that the dimensions of base 26 may vary to accommodate any alternative number of dividers. Upright post 32 is a tubular member welded to base 26 and comprises a height of approximately 4'. Sign 34 is a triangular plate coupled to the top portion of upright post 32. Sign 34 may comprise any letters, numbers, symbols, designs, logos or text, such as instructions for storing and removing vehicular boot 10 from boot return station 12. The components of boot return station 12 are preferably made from steel. However, alternative metals or materials may be used instead.

In operation, vehicular boots 10 are disposed on boot return station 12 as depicted in FIG. 4. More specifically, a first vehicular boot 10 is disposed between first and second dividers 28, 30. A second vehicular boot 10 is disposed between second divider 30 and upright post 32. Tail chain 18 of each vehicular boot 10 is wrapped around either first divider 28 or second divider 30 and inserted through the hole and tubular ring 22 of triangular sheet 14. Lock 24 is coupled to the second end of tail chain 18. This locks each vehicular boot 10 to boot return station 12 and prevents tail chain 18 from detaching from the hole and tubular ring 22 of triangular sheet 14.

Figure 5:
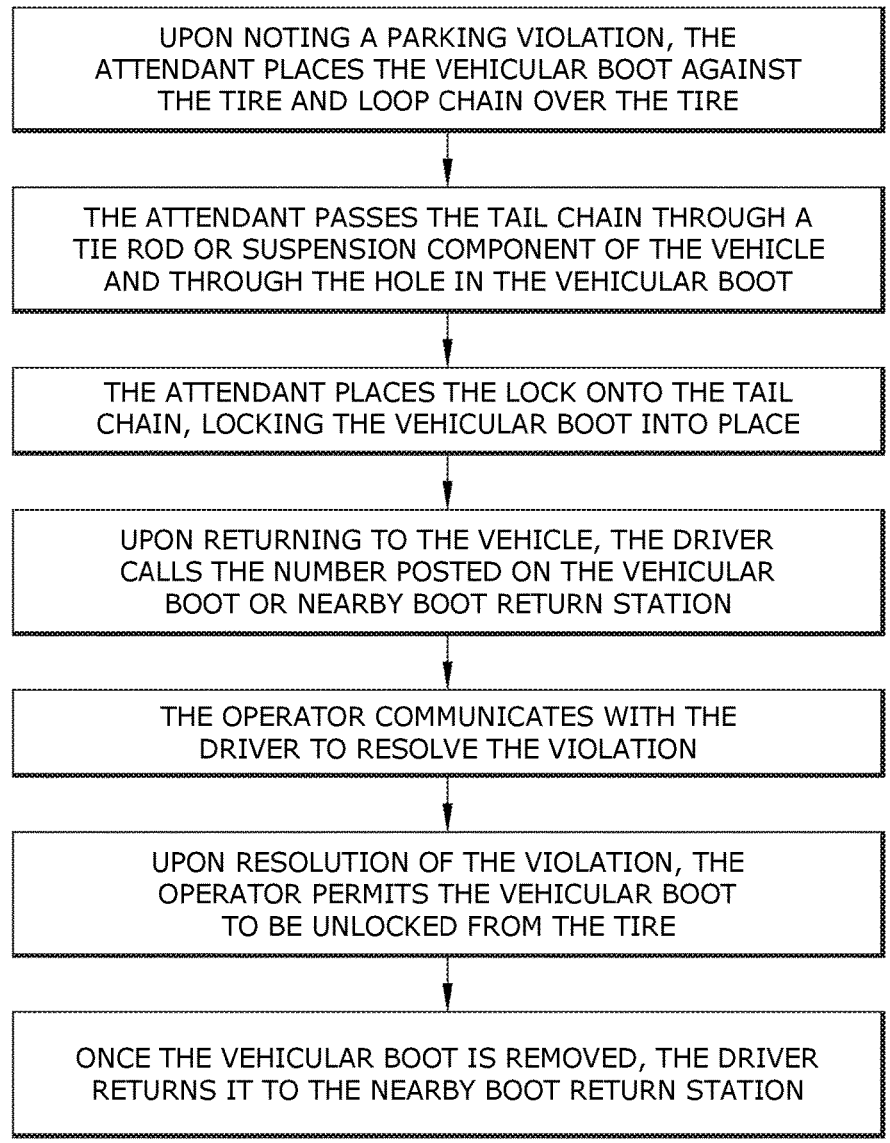
FIG. 5 depicts a flowchart of a method of using the vehicular boot and boot return station in accordance with certain embodiments of the invention.

FIG. 5 depicts an exemplary method of using vehicular boot 10 and boot return station 12 in accordance with certain embodiments of the invention. In the exemplary method, an attendant of a parking enforcement company notices a vehicle with a parking violation. The attendant secures vehicular boot 10 to preferably the front driver side tire of the vehicle. This is accomplished by placing triangular sheet 14 against the side of the vehicle's tire and rim. Loop chain 16 is disposed around the tire. Tail chain 18 is inserted through a tie rod or suspension component of the vehicle, then passed through the hole and tubular ring 22 of triangular sheet 14. Lock 24 is coupled to the second end of tail chain 18. This locks vehicular boot 10 to the vehicle's tire.

Upon returning to the vehicle, the driver calls the number of the parking enforcement company. The company's contact information may be printed directly on vehicular boot 10 or posted on a nearby boot return station 12. An operator communicates with the driver to resolve the violation, which may include retrieving payment information from the driver and completing a transaction to pay the fine for the parking violation.

Once the parking violation is resolved, the operator permits vehicular boot 10 to be unlocked from the tire. In one embodiment, the operator provides the driver with the combination code for lock 24 coupled to tail chain 18 of vehicular boot 10. In an alternative embodiment, the operator may be able to release lock 24 by remote access if lock 24 is an electronic lock. Once lock 24 is unlocked, the driver removes lock 24 from tail chain 18, removes tail chain 18 from the vehicle's tie rod or suspension component, and removes loop chain 16 from the vehicle's tire. Vehicular boot 10 is now detached from the tire.

The driver returns vehicular boot 10 to a nearby boot return station 12. Vehicular boot 10 is disposed between first and second dividers 28, 30 or between second divider 30 and upright post 32. Tail chain 18 of vehicular boot 10 is wrapped around either first divider 28 or second divider 30 and inserted through the hole and tubular ring 22 of triangular sheet 14. Lock 24 is coupled to the second end of tail chain 18. This locks vehicular boot 10 to boot return station 12.

It shall be appreciated that the components of vehicular boot 10 and boot return station 12 described in several embodiments herein may comprise any alternative known materials in the field and be of any color, size and/or dimensions. It shall be appreciated that the components of vehicular boot 10 and boot return station 12 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A releasable vehicular boot coupled to a tire of the vehicle and configured to immobilize the tire, the vehicular boot configured to be secured to and removed from the tire with enhanced efficiency, the vehicular boot comprising:
    a generally triangular sheet comprising a first corner, a second corner and a third corner, the triangular sheet comprising a hole situated proximate the first corner;
    a first chain comprising a first end coupled to the second corner of the triangular sheet and a second end coupled to the third corner of the triangular sheet to create a loop in the first chain; and
    a second chain comprising a first end and a second end, the first end of the second chain being slidably mounted to the first chain;
    wherein the loop in the first chain is disposed around the tire, wherein the second chain is disposed through a suspension component of the vehicle and the hole in the triangular sheet, the second end of the second chain being coupled to a locking mechanism to prevent a detachment of the second chain from the hole in the triangular sheet, thereby securing the vehicular boot to the tire of the vehicle.

2. The releasable vehicular boot of claim 1, wherein the first end of the second chain comprises a ring configured to permit the first chain to slidably adjust therethrough.

3. The releasable vehicular boot of claim 2, wherein the locking mechanism comprises a padlock.

4. The releasable vehicular boot of claim 3, further comprising a tubular ring coupled to the hole in the triangular sheet.

* * * * *